A. AND A. A. JUELFS.
DUMPING TRUCK.
APPLICATION FILED JULY 31, 1919.

1,366,666.

Patented Jan. 25, 1921.
2 SHEETS—SHEET 1.

Inventors
Albert Juelfs
Allen A. Juelfs
By D. A. Gowrick Attorney

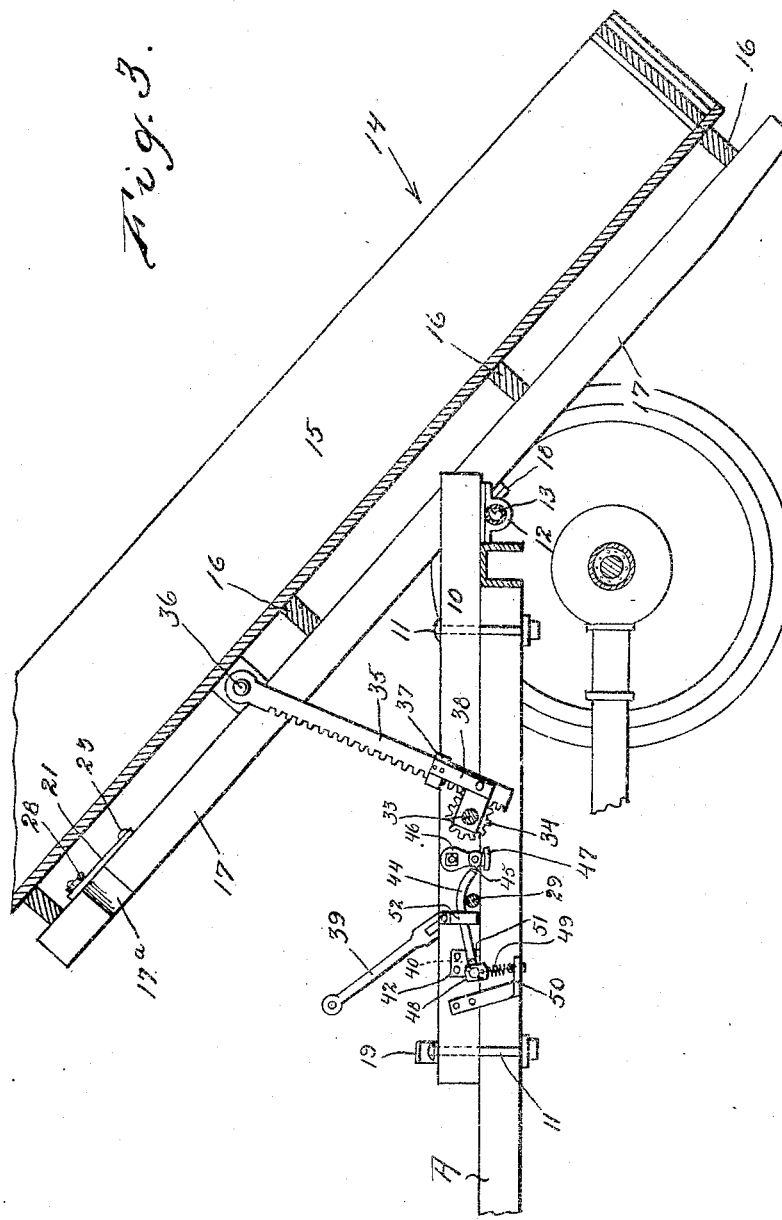

UNITED STATES PATENT OFFICE.

ALBERT JUELFS AND ALLEN A. JUELFS, OF DIXON, ILLINOIS.

DUMPING-TRUCK.

1,366,666.  Specification of Letters Patent.  Patented Jan. 25, 1921.

Application filed July 31, 1919. Serial No. 314,521.

*To all whom it may concern:*

Be it known that we, ALBERT JUELFS and ALLEN A. JUELFS, citizens of the United States, residing at Dixon, in the county of Lee and State of Illinois, have invented certain new and useful Improvements in Dumping-Trucks, of which the following is a specification.

This invention relates to dumping trucks, particularly to motor dumping trucks and the body construction thereof, and has for its object the provision of a motor truck body which is so constructed and mounted that it may be readily tilted rearwardly into dumping position or to facilitate loading.

An important object is the provision of a truck body of this character provided with gear actuated means for raising and lowering the body or rather tilting it upon its axis.

Another object is the provision of novel means for holding the body in tilted position.

Still another object is the provision of a novel catch mechanism for locking the body against tilting movement.

An additional object is the provision of a truck body of this character which will be simple and inexpensive in manufacture, highly efficient in use, durable in service, and a general improvement in the art.

With the above and other objects and advantages in view the invention consists in the details of construction to be hereinafter more fully described and claimed and illustrated in the accompanying drawings in which—

Figure 1:
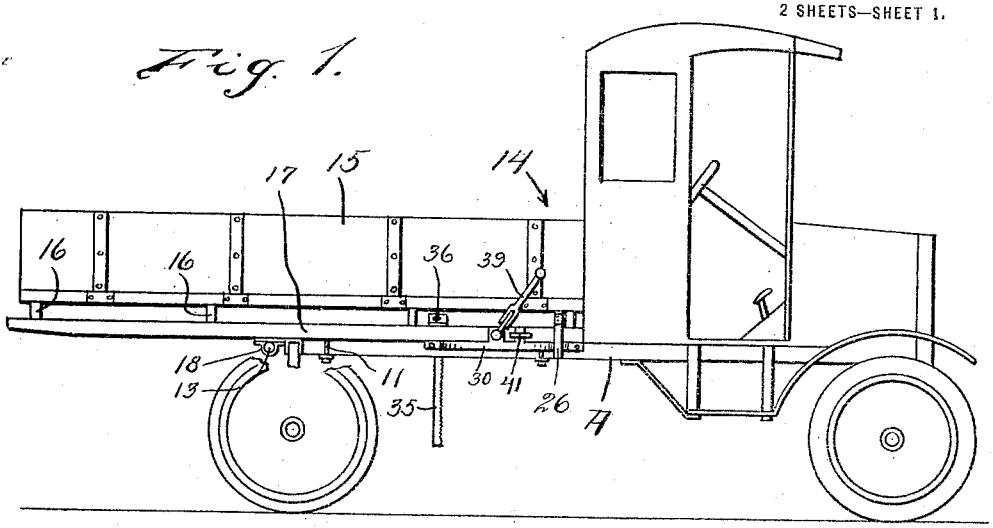
Figure 2:
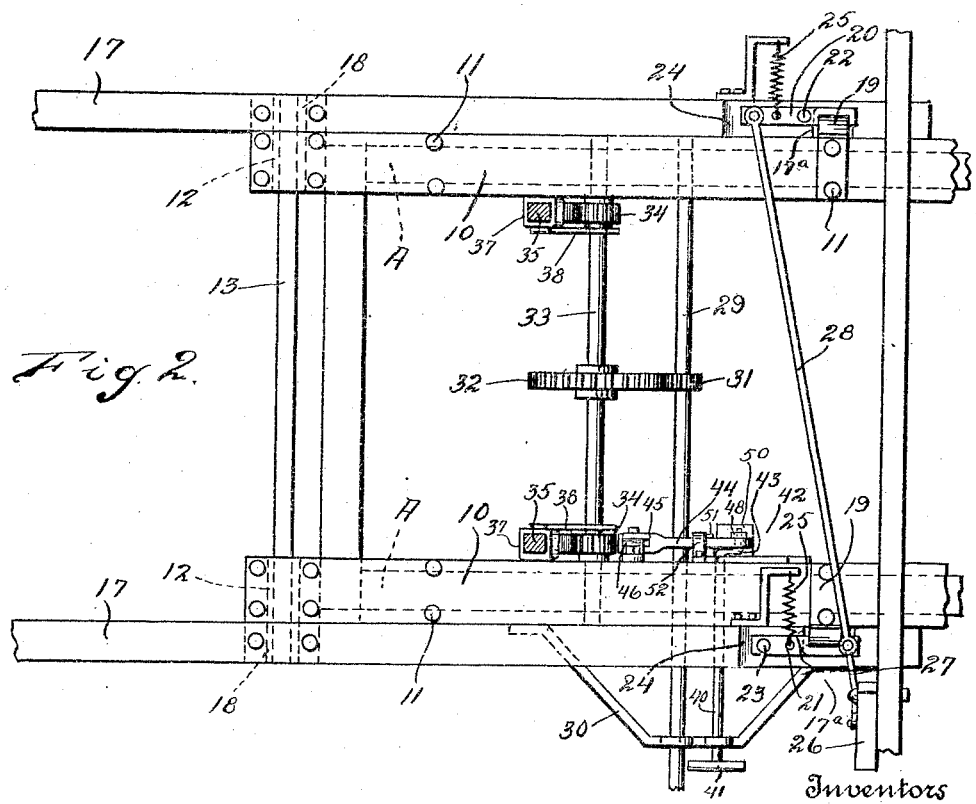

Figure 1 is a side elevation of a motor truck showing the body thereon in normal position, Fig. 2 is a horizontal sectional view with parts removed, and Fig. 3 is a longitudinal sectional view taken from the side opposite to that shown in Fig. 1 and showing the body in tilted position.

Referring more particularly to the drawings, the letter A designates the frame of an automobile chassis of any make or type, this detail being immaterial.

In carrying out the invention, use is made of a sub-frame including heavy beams 10 disposed upon the bars of the frame A and secured thereto by any suitable means such as U bolts 11 which pass through the beams 10 and embrace the frame bars A. The beams 10 project beyond the rear ends of the bars A and carry on the undersides of such projecting ends brackets 12 through which extends a shaft 13 which may be conveniently a length of pipe.

The truck body is designated broadly by the numeral 14 and comprises a box like open topped structure 15 supported upon transverse bars 16 carried by longitudinal bars 17 which are disposed against the outer sides of the beams 10 and which extend appreciably beyond the rear ends thereof. Secured upon the under sides of the bars 17 are brackets 18 revolubly engaged upon the ends of the shaft 13. By this construction it will be seen that the truck body is pivotally mounted so that it may be swung in a vertical plane.

In order to hold the body down upon the automobile chassis and prevent tilting, there are provided catches 19 which are secured upon the tops of the beams 10 and which project laterally partly over the bars 17. The bars 17 are of course provided with cut-out portions 17$^a$ which allow the passage of the catches 19 when the body is swung to normal position. Coöperating with these keepers or catches are latch bars 20 and 21, the former being pivoted intermediate its ends upon one bar 17, as shown at 22, and the other being pivoted at one end upon the other bar 17, as shown at 23. These latch bars are disposed within shallow recesses 24 and when in normal position engage beneath the catches or keepers 19, this normal position being maintained by means of suitably arranged springs 25.

In order to effect release of the latch bars from engagement with the keepers, there is provided a lever 26 suitably pivoted at one side of the body and connected by a link 27 with the forward end of the latch bar 21. This latch bar 21 is, in turn, connected by a link 28 with the rear end of the latch bar 20. When the lever 26 is properly moved, the forward ends of the latch bars 20 and 21 will swing outwardly and out of engagement with the keepers 19 and thus permit the body to be tilted or swung.

In order that the body 14 may be tilted upon the pivot shaft 13, there is provided a shaft 29 journaled transversely of the bars 10 and having one end journaled through a bracket 30 secured upon the frame bars A. This shaft 29 carries at its central portion a pinion 31 which meshes with a gear 32 mounted on a transverse shaft 33 journaled through the bars 10. At its ends, the shaft 33 carries pinions 34 with which mesh rack bars 35 pivotally connected with the body 14, as shown at 36. The rack bars 35 are held in engagement with the pinions 34 by means of guides 37 which slidably receive the rack bars and which include arms 38 engaged upon the shaft 33. The projecting end of the shaft 29 beyond the bracket 30 carries a crank handle 39 whereby the pinion 31 and other gears may be rotated for tilting the body 14 upon the shaft 13, as will be readily apparent.

In order that the body may be held in tilted position at any desired height, there is provided a shaft 40 which is journaled through the bars 10 and through the bracket 30 and which has its projecting end beyond the bracket 30 provided with a cross handle 41. The shaft 40 extends through a bearing plate 42 secured upon the inner face of the bar 10 and is formed adjacent this plate with a crank portion 43. Pivotally connected with the crank 43 is a bar 44 which is provided with a fork 45 pivotally connected with a pawl 46 which is pivoted upon the bar 10 and which has a tooth 47 adapted for engagement with the adjacent pinion 34. Secured to the crank portion 43 is a member 48 to which is connected one end of a coil spring 49 which has its other end connected with a bracket 50 secured upon the bar 10. The bearing plate 42 is provided with a lip 51 which engages against the under side of the arm 44 for limiting the downward movement thereof.

After the body 14 has been tilted by rotation of the crank 39, when it is desired to lock the body against movement, it is merely necessary that the operator grasp the handle 41 and turn the shaft 40 a half revolution in a counter-clockwise direction whereupon the arm 44 will move and will swing the pawl 46 so that the tooth 47 thereon will engage between two teeth on the adjacent pinion 34. The parts will remain in this position until the operator returns the handle 41 and consequently the shaft 40, to the normal position shown in the drawings, whereupon the body 14 may be swung to horizontal position. When the body is in horizontal position, it is of course understood that it is held so by virtue of the engagement of the latch bars 20 and 21 with the keepers 19. It should be stated that a bracket 52 is provided upon the bars 10 and engaging over the arm 44 for guiding the arm in its movement.

From the foregoing description and a study of the drawings it will be apparent that there has thus been provided a simple and efficient body construction for motor trucks so arranged that the body may be tilted to bring the rear end thereof into engagement with the ground to dump the contents of the body or to permit the disposition of freight upon the body.

While there has been shown and described the preferred embodiment of this invention, it is of course to be understood that the right is reserved to make such changes in the form, construction and arrangement of parts as will not depart from the spirit of the invention or the scope of the subjoined claims.

We claim:

1. A truck body comprising a sub-frame including longitudinal bars adapted for disposition upon the longitudinal bars of the chassis of a motor vehicle, a body proper pivotally mounted upon said sub-frame, downwardly extending rack bars pivotally connected with said body, a transverse shaft journaled through said sub-frame, means for rotating said shaft, pinions on the ends of said shaft meshing with said rack bars, guide members slidably engaging said rack bars and in journaled connection with said shaft whereby upon rotation of said shaft said body will be tilted upon its pivot, and means for locking said body in tilted position, comprising a pawl pivoted upon the sub-frame, and an operating member journaled through one side of the latter, provided with a handle, and operatively connected with the pawl whereby to swing the latter into or out of engagement with the adjacent pinion.

2. A truck body comprising a sub-frame including longitudinal bars adapted for disposition upon the longitudinal bars of the chassis of a vehicle, a body proper pivotally mounted upon said sub-frame, downwardly extending rack bars pivotally connected with said body, a transverse shaft journaled through said sub-frame, means for rotating said shaft, pinions on the ends of said shaft meshing with said rack bars, guide members slidably engaging said rack bars in journaled connection with said shaft whereby upon rotation of said shaft said body will be tilted upon its pivot, and means for locking said body in tilted position, said means comprising a pawl pivoted upon said sub-frame, a shaft journaled through said sub-frame and having at one end an operating handle and at the other end a crank portion and a lateral arm, said lateral arm being pivotally connected with said pawl.

In testimony whereof we hereto affix our signatures.

ALBERT JUELFS.
ALLEN A. JUELFS.